United States Patent [19]
Whitty

[11] Patent Number: 5,672,081
[45] Date of Patent: *Sep. 30, 1997

[54] SURF FIN FIXING SYSTEM

[75] Inventor: Brian Alan Whitty, Elanora, Australia

[73] Assignee: Fin Control Systems Pty. Limited, Mona Vale, Australia

[*] Notice: The term of this patent shall not extend beyond the expiration date of Pat. No. 5,464,359.

[21] Appl. No.: 554,554

[22] Filed: Nov. 6, 1995

Related U.S. Application Data

[63] Continuation of Ser. No. 273,743, Jul. 12, 1994, Pat. No. 5,464,359, which is a continuation-in-part of Ser. No. 25,656, Mar. 3, 1993, Pat. No. 5,328,397.

[30] Foreign Application Priority Data

Mar. 9, 1992 [AU] Australia ................ PL6973
Nov. 2, 1992 [AU] Australia ................ PL5226

[51] Int. Cl.⁶ .................................................. B63B 1/00
[52] U.S. Cl. .................................................. 441/79
[58] Field of Search .................. 441/74, 79, 65; 114/39.2, 127, 138, 140, 142, 274, 357, 126, 135, 136; 403/263, 264, 362

[56] References Cited

U.S. PATENT DOCUMENTS

| | | | |
|---|---|---|---|
| 3,516,099 | 6/1970 | Money et al. | 441/79 |
| 3,585,663 | 6/1971 | Johnson | 114/140 |
| 4,493,665 | 1/1985 | Liddle | 441/79 |
| 5,007,868 | 4/1991 | Fry | 441/79 |
| 5,032,096 | 7/1991 | Scott et al. | 114/140 |
| 5,464,359 | 11/1995 | Whitty | 441/79 |

Primary Examiner—Jesus D. Sotelo
Attorney, Agent, or Firm—Beveridge, DeGrandi, Weilacher & Young, L.L.P.

[57] ABSTRACT

A system for attaching fins (11) to surfboards and other surf craft utilizes fixing elements (12) embedded in the body of the board, these elements having slots (13) which receive tabs (18) extending from the end of the fin. The tabs are removably secured by grub screws (16) enabling fins to be removed for transport or upon damage.

3 Claims, 3 Drawing Sheets

SURF FIN FIXING SYSTEM

REFERENCE TO RELATED APPLICATIONS

This is a continuation of U.S. patent application Ser. No. 08/273,743, filed on Jul. 12, 1994, now U.S. Pat. No. 5,464,359, which was a continuation in part of U.S. patent application Ser. No. 08/025,656, filed on Mar. 3, 1993, now U.S. Pat. No. 5,328,397.

In the manufacture of surfboards, a body of plastics foam material is shaped and then covered with a layer of fibre-reinforced resin, normally fibreglass.

One or more fins, most commonly three, are fixed to the board at the rear, normally by one of two methods, either by attaching the fins to the board by means of fibre reinforced resin around the base of the fin, or by the use of a so-called "fin box". Each of these approaches has significant disadvantages.

Glassing the fins to the board involves considerable labour costs and makes subsequent sanding and finishing of the board difficult. A further disadvantage of this fixing method is that the fibreglass fillet region at the base of the fin interferes with the hydrodynamics of the fins. This is believed to arise firstly from a reduction in the effective height of the fin, and from the outward flow of water caused by the fixing region, which in turn leads to turbulence and cavitation. As a result, the drive and bite afforded by the fins during turns is reduced, and the performance and speed of the board is limited.

A further disadvantage of the attachment of fins by glassing on is that the fins must be present, fixed to the board, during all final finishing stages of the board's manufacture, increasing labour costs and restricting the quality of the final finish of the board.

In the use of the fin box, a rectangular cavity is formed in the board by the use of a router and the fin box inserted into this cavity. The fin box comprises a slot for the reception of the base of the fin, with a wider portion forming a lower slot at its base into which may be slid a pin, mounted horizontally through the front of the fin, to fix the front of the fin in the box. The rear of the fin is fixed by means of a vertical screw through a rearwardly extending portion of the base of the fin, this screw being driven into a drilled and tapped plate located in the rear end of the lower slot.

The use of fin boxes involves many disadvantages, including costly, labour-intensive fitting, an increase in the weight of the board, and looseness of fin fixture which causes reduced fin performance and leads to cracking of the joint between the box and the board. These disadvantages of the fin box system, and others including the drag produced by the exposed slot at each end of the fin, are well-known, and have lead to the general demise of this system.

The fin box does offer a theoretical advantage over the glassing-on of fins, and this is in the removability of the fins in the case of their need for replacement, for example, for repair or during travel. The fin box design, however, makes removal and replacement difficult, and as a result this potential advantage is not realised.

In the practice of the present invention, fins are fitted by fixing in the board a number of plugs each of which is recessed to receive a mating tab or fixing member extending from the base of the fin. Preferably the plugs are cylindrical, so they can fixed within drilled recesses in the board. The tabs may be fixed within the plug recesses by means which laterally engage the tabs, such as one or more screws, by friction, or by other means such a snap fitting formations.

In the preferred form of the invention, two plugs are provided per fin, and each fin is provided with a pair of tabs of rectangular cross-section dimensioned to fit neatly within rectangular recesses in the respective plugs, but of course other configurations may be used.

A presently contemplated embodiment of the invention is illustrated in the accompanying drawings, in which.

Figure 1:
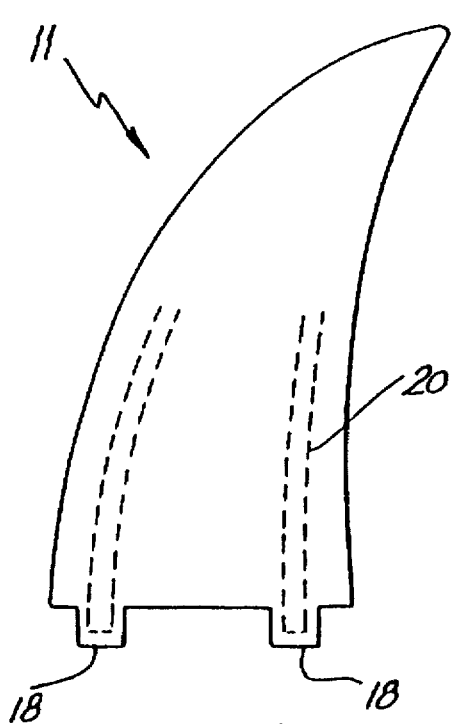
FIG. 1 is a side elevation of a surfboard fin.
Figure 2:
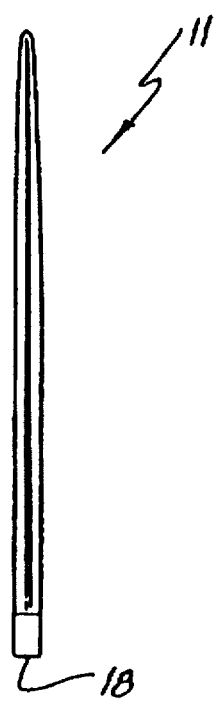
FIG. 2 is an end elevation of the fin of FIG. 1.
Figure 3:
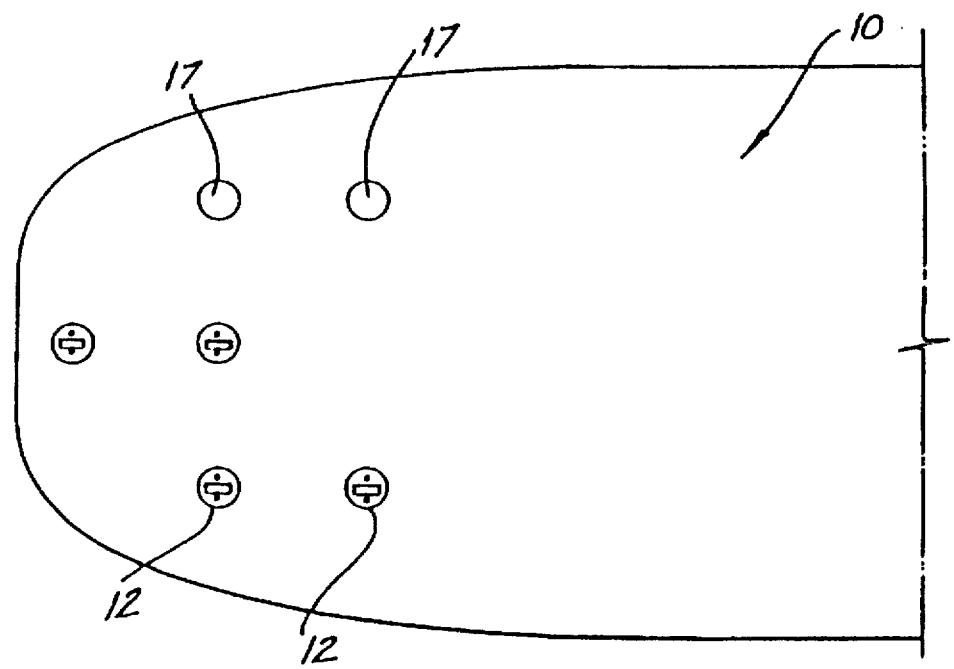
FIG. 3 is a plan view of the rear part of a surfboard.
Figure 4:
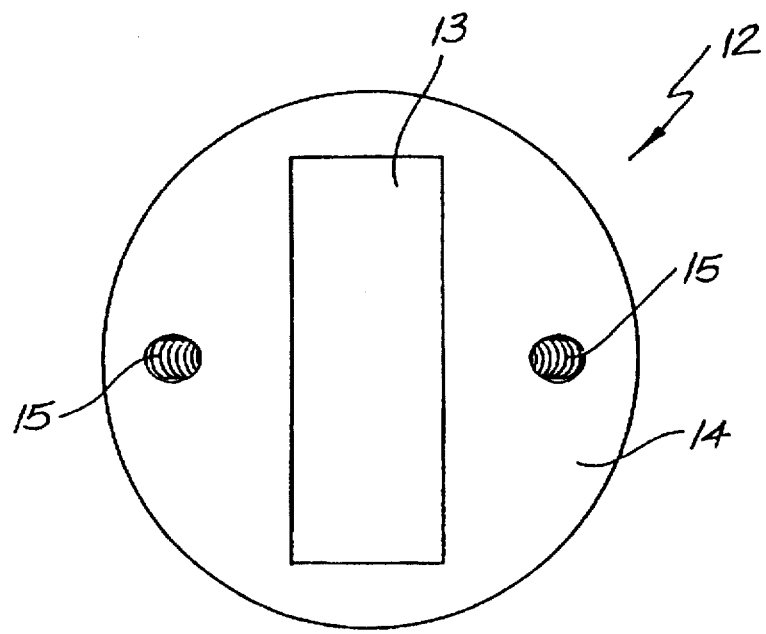
FIG. 4 is plan view of a fixing plug for use in the invention.
Figure 5:
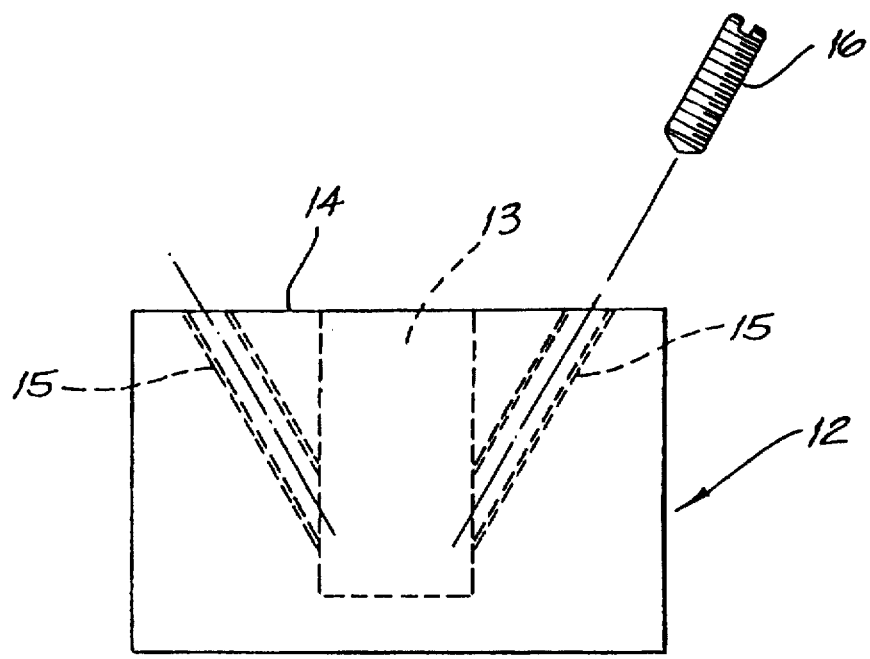
FIG. 5 is a side elevation of the plug of FIG. 3.

In the illustrated embodiment, a surfboard 10 is adapted for the fitting of three fins 11 in accordance with the present invention by the fixing in the board of three pairs of fixing plugs 12.

Each of the plugs 12 consists of a cylindrical body moulded from suitable material such as polycarbonate, and is provided with a rectangular slot 13 opening to its upper face 14. Each plug 12 is also provided with a pair of obliquely drilled tapped hole 15, extending from the face 14 and intersecting the slot 13. One of these holes 15 receives grub screw 16 as described below.

The plugs 12 are fixed, by means of polyester resin or other adhesive chosen for compatibility with the materials of the board and the plugs, in circular holes 17 drilled in the board. These holes may be formed at any convenient stage in the manufacture of the board, but in particular they may be drilled after the glassing of the board, thereby simplifying the finishing steps in board manufacture. Although it is not essential that the holes 17 be circular, this is preferred, because a hand drill can be used, and in conjunction with suitable jigs and templates the holes 17 can be quickly and accurately placed in the board.

In the preferred form illustrated, two plugs are provided for each fin, and each fin is provided with a pair of tabs 18 extending downwardly from the base of the fin and spaced apart the same distance as the plugs 12. These tabs 18 are dimensioned for an interference fit in the slots 13 of the plugs 12. By forcing the tabs into the slots, the fin is mounted on the board, and then locked in place by driving home the grub screw 16 so that it bears against the tab 18. The open end of the hole 15 may be closed with a core plug pressed into the hole so that its upper face is flush with the surface of the plug 12.

In this way a fin fixing is achieved which combines simplicity of manufacture with lightness and strength, and provides greater ease of assembly and disassembly than the use of a fin box. Since the plugs 12 present an uninterrupted surface flush with that of the board, and may further be canded and finished along with the board surface, the final finishing steps of board manufacture may be carried out without the fins in place to obstruct the operator or the equipment, thereby reducing costs an enabling better finishes to be obtained, and the hydrodynamic deficiencies of the prior art arrangements are avoided.

Figure 6:
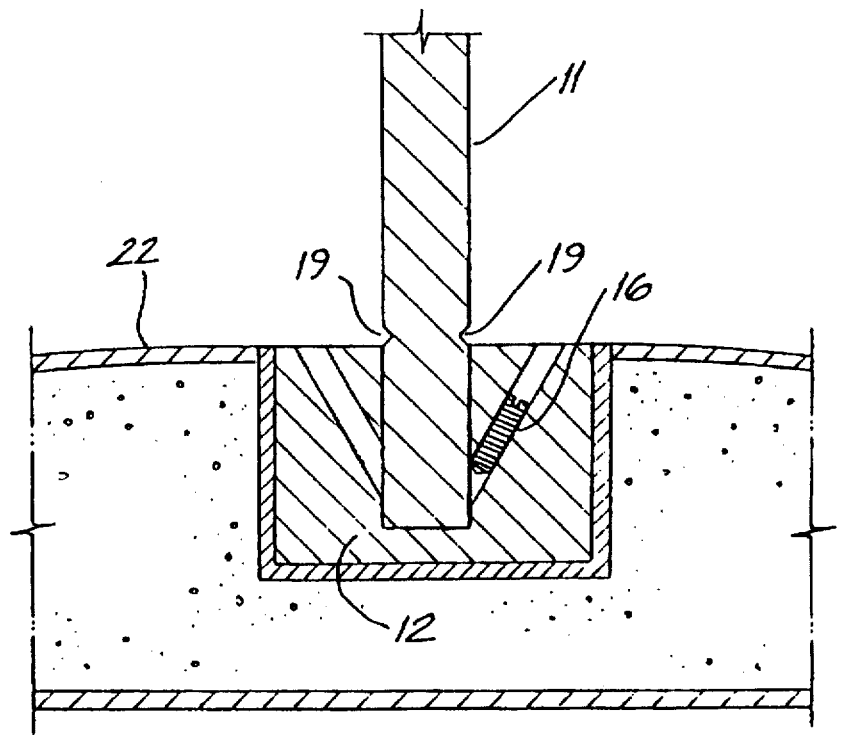
FIG. 6 shows in fragmentary cross-section the fixing of a fin and a plug in the surfboard.

Damage to the surfboard upon the breakage or traumatic removal of a fin will be less in the case of the present invention than in the prior art, but can be further reduced by the modification shown in FIG. 6, where the base of the fin 11 is weakened, for example by a pair of V-shaped grooves 19 which provide a line of weakening along which the fin will break, rather than tearing out the plugs 12.

In an alternative approach to damage minimisation according to a preferred form of the invention, the fins, which are normally manufactured of cast lightweight resin covered with a fibreglass skin, are provided with trails of glass fibre 20 (FIG. 1) embedded in the resin body and extending from the fixing tabs 18. It is found that with this construction, where the fin is broken in a wipeout or during transport, the fin tends to fold about the region of the junction of the tabs 18 with the body of the fin, with the trails 20 breaking through the resin body of the fin, reducing the likelihood of consequential damage to the board.

Figure 7:
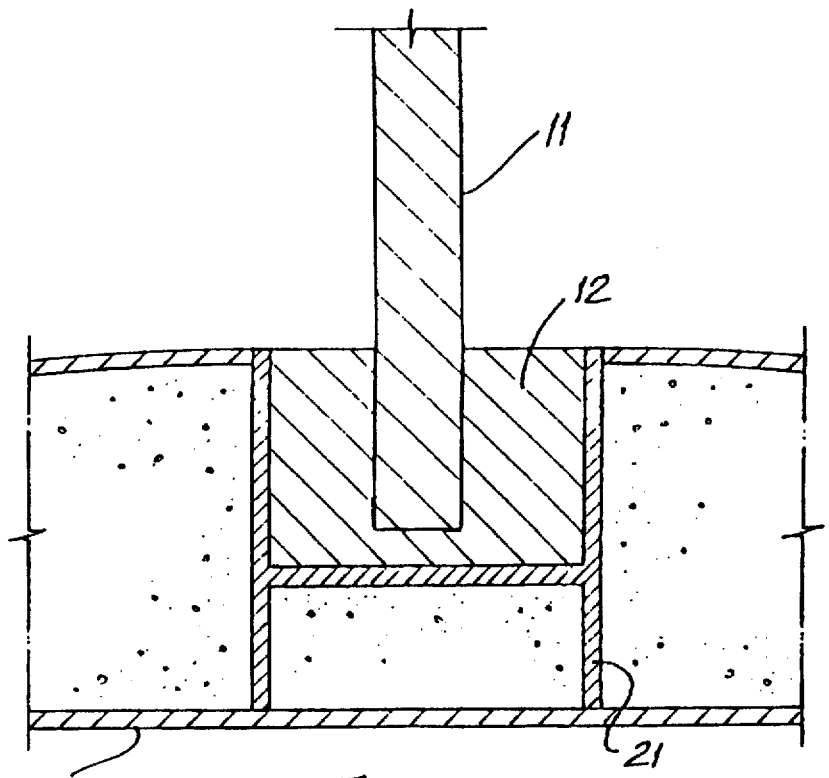
FIG. 7 is a fragmentary cross-section of an alternative fixing structure.

FIG. 7 illustrates another approach to the fixing of plugs 12 within the surfboard. In this case the board is drilled to create a cylindrical hole for the reception of the plug 12, but before the plug is introduced, a circular cutter is used to remove material from a annular region 21 extending from the base of the hole to the skin 22 on the remote surface of the board. This space is filled with resin prior to the introduction of the plug 12, resulting in a structure of greater strength that that of FIG. 6.

The fixing system described can provide features not possible in the prior art. For example, three or more plugs may be provided for each fin location, enabling a choice in the location of the fins, for example in the case of three plugs, by either engaging the front tab of the fin in the centre plug with the rear tab in the rearmost plug, or engaging the front tab with the foremost plug and the rear tab with the centre plug. The slots of the unused plugs may be provided with core plugs neatly fitting within the slot and fixed in place by a grub screw 16. In a similar way, a board may be manufactured for use with three fins, but the user may remove one or more of the fins should he wish, replacing the fin tabs with core plugs provided by the manufacturer for that purpose.

In a further development of the invention, a range of fins can be produced differing in the location of the tabs fore or aft, so that the fore-and-aft position of the fins on the board may be fine-tuned by the owner or the surf shop. In each case, of course, the distance between the tabs and the tab dimensions remain constant and are standardised for all boards. Furthermore, a range of fins of differing shapes and sizes can be manufactured with standard fixing arrangements, enabling increased freedom of choice on the part of surfers in the setting up of their boards.

While in the above-illustrated embodiments the plugs 12 are separately moulded, they may instead be cast in situ in the drilled holes 17, with the slot 13 being formed by a removable plug and the hole 15 drilled after the plug 12 has hardened. Such a method of preparation has the advantage that the shape of the cavity 17 can be altered to increase the security of the fixture of the plug 12.

Other arrangements may also be adopted within the scope of the invention.

I claim:

1. A surf craft including a body with a fixing element embedded therein, said fixing element being of material of greater strength than that of the surf craft body and having a fixing cavity therein, a fin attached to the surf craft, said fin having a pair of lateral surfaces and an end surface, the end surface of the fin abutting against the lower surface of the body in the region of said fixing element, the fin having a fixing formation extending from its end surface, said formation being engaged within the cavity of said fixing element by releasable means laterally engaging said formation, said surf craft body being covered by a skin of fibre-reinforced plastics, a cavity provided in said body between the inner end of said fixing element and the skin of the craft on the side of the craft opposite the fin, said cavity being filled with a hardenable material.

2. A surf craft according to claim 1 wherein each said cavity in said body is of annular shape.

3. A surf craft according to claim 1 wherein said fin includes a plurality of said fixing formations and said body has a plurality of said fixing elements embedded therein, each fixing formation of said fin being engaged in the cavity of a respective one of said fixing elements.

* * * * *